United States Patent [19]

Allen

[11] 4,376,142
[45] Mar. 8, 1983

[54] METHOD FOR FINISHING FIBERBOARD UTILIZING A FROTHED PRIME COAT

[75] Inventor: James A. Allen, Macon, Ga.

[73] Assignee: Armstrong World Industries, Inc., Lancaster, Pa.

[21] Appl. No.: 180,653

[22] Filed: Aug. 25, 1980

[51] Int. Cl.³ .............................................. B05D 3/02
[52] U.S. Cl. .................................. 427/393; 427/373; 427/382; 427/408; 427/412
[58] Field of Search ............... 427/373, 379, 271, 381, 427/382, 385.5, 392, 389, 393, 389.9, 393.6, 407.1, 407.3, 402; 264/48, 321

[56] References Cited

U.S. PATENT DOCUMENTS

| | | | |
|---|---|---|---|
| 3,047,449 | 7/1962 | Coble | 156/79 |
| 3,428,471 | 2/1969 | Tuthill et al. | 427/373 |
| 3,607,341 | 9/1971 | Goins et al. | 427/373 |
| 4,044,178 | 8/1977 | Abel et al. | 427/389.9 |
| 4,049,848 | 9/1977 | Goodale et al. | 427/373 |

Primary Examiner—S. L. Childs

[57] ABSTRACT

In a method for prime coating fiberboard products the improvement wherein a foaming agent is added to a conventional aqueous latex based prime coating and the coating aerated to give a frothed prime coating having a consistency of 500 to 750 grams per liter, the frothed coating applied to the board product at a rate of 220 to 320 grams per square meter, and heated to collapse the froth and dry the coating.

3 Claims, No Drawings

METHOD FOR FINISHING FIBERBOARD UTILIZING A FROTHED PRIME COAT

BACKGROUND OF THE INVENTION

1. Field of the Invention

This invention relates to an improved method for finish coating fiberboard products such as mineral wool and wood acoustical ceiling tile.

2. Description of the Prior Art

Mineral wool and wood fiber ceiling tile products are ordinarily formed from slurries of the board forming ingredients using conventional Fourdrinier and Oliver board forming equipment. After drying and cutting to size the board products are sanded and then painted by first prime coating the board and then finish coating the board.

SUMMARY OF THE INVENTION

Because of the porous nature of the board, conventional prime coats bleed into the board product requiring both large amounts of prime coat to give the required hiding power and high energy usage for drying. I have found that I can froth a slightly modified standard prime coat formulation to form a prime coat having a consistency similar to shaving cream. When this prime coat is utilized in finishing board products, I can get equivalent or better hiding power at considerably lower usage rates and can conserve a considerable amount of energy in the finishing operation.

DETAILED DESCRIPTION

Conventional prime coats used in finishing fiberboard products are water base paints conventionally containing clay, thickeners, wetting agents, aqueous latex binders and plasticizers, along with defoamers. By simply deleting the defoamers from these conventional formulations and adding a foaming agent, aerating the paint to form a froth coating having a consistency of 500 to 750 grams per liter, fiberboard products can now be primed at a much lower usage rate of coating for equivalent hiding power and also require less energy to properly dry the prime coated product. The following example illustrates a preferred embodiment of my invention.

EXAMPLE

| Ingredients | Standard Prime Coat Parts by Weight | Froth Prime Coat Parts by Weight |
|---|---|---|
| Water | 12.78 | 12.49 |
| Klondyke Clay Slurry (70% Solids) | 59.64 | 58.29 |
| Sodium alginate thickener (Keltex) | 0.088 | 0.086 |
| Aryl alkyl sulfonate surfactant (Polywet ND-2, 25% Solids) | 0.052 | 0.051 |
| Nuclay Slurry (70% Solids) | 20.31 | 19.86 |
| Plasticizer (35% Dibutyl Phthalate, 65% diisobutyrate ester of neopentyl glycol) Eastman 135 | 0.208 | 0.204 |
| Polyvinyl acetate latex[1] (58% Solids-Wallpol 40-311) | 6.64 | 6.49 |
| Formaldehyde (37%) | 0.08 | 0.078 |
| Ammonia | 0.104 | 0.102 |
| Sodium Lauryl Sulfonate Surfactant (Tannawet LS) | — | 0.745 |
| Foam Aid. No. 1 | — | 1.49 |
| Sodium Succinate Defoamer (NDW-Napco Chemical Co.) | 0.048 | |

[1] Viscosity (CPS) 1500 - Tg 33

The modified prime coat above containing the foaming agent and foaming aid was frothed using a conventional Oaks foamer to produce a frothed prime coating having a consistency of 625 grams per liter. Actually this coating had a consistency similar to shaving cream.

Generally, the preferred latex paints of this invention comprise, on a solids basis, 49 to 61 parts by weight clay; 3 to 5 parts by weight latex, preferably polyvinyl acetate latex commercially available such as Wallpole 40-311, Polyco 2113, MCar 130 and Duroset SB321; and from 0.5 to 1.5 parts by weight surfactant. Other preferred surfactants include N-Tallow Sulfo Succinimate and Ether Sulfo Succinimate.

Wood fiberboard products prepared from water laid webs, which were then dried and sanded to give a smooth outer surface, were primed and then finish coated using conventional finishing procedures and the froth prime coated products were then compared to equivalent wood fiberboard products which has been primed and finished with the standard paints. The composition of the boards was as follows:

| Ingredient | Parts by Weight |
|---|---|
| Wax | 0.2 |
| Starch Binder | 6.0 |
| Newsprint (pulped) | 8.0 |
| Broke (Ground Board Scrap) | 36.0 |
| Woodpulp | 49.8 |

A standard board finishing line containing a roll coater was utilized for applying the prime coat, an oven for drying the prime coat, another roll coater for applying the finishing coat and a further oven for drying the finishing coat. Sanded board products of the above composition were prime coated with both the standard formulation and with the frothed formulation set forth above. The standard prime coat was applied at a rate of 400 grams per square meter and the frothed prime coat was applied at a rate of 260 grams per square meter. The primed boards were dried at temperatures of respectively 525° F. for the standard and 300° F. for the froth. The lower temperature required for collapsing and drying the froth prime coat resulted in a savings of approximately 40% of the energy required for drying the conventional prime coat, i.e. 40% of the burners were turned off.

A finish coat was applied at a rate of 300 grams per square meter using the standard prime coated board whereas, with the board which has been primed with the froth coating, a 32 gram reduction was achieved (268 grams per square meter).

| Finish Coat Formulation | |
|---|---|
| Ingredient | Parts by Weight |
| Water | 48.525 |
| Sodium Alginate Thickener | 0.194 |

| Finish Coat Formulation | |
|---|---|
| Ingredient | Parts by Weight |
| (Keltex) | |
| Tetrasodium Pyrophosphate | 0.209 |
| TiO$_2$ (pigment grade) | 4.109 |
| Talc | 8.217 |
| Calcium Carbonate | 27.639 |
| Polyvinyl Acetate Latex Wallpole 40-31 (58% solids) | 10.652 |
| Plasticizer (35% Dibutyl Phthalate - 65% diisobutyrate ester of neopentyl glycol) | 0.336 |
| Defoamer (NDW-Napco Chemical Co.) | 0.0598 |

Tile produced in accordance with the above were subjected to accelerating aging exposures in hot, wet and hot, dry rooms. They were then tested for color stability, adhesion, scrub resistance, surface durability, blocking and warp. These properties were reexamined after two and four week exposures in the hot, wet room and hot, dry room. Results indicated comparable performance between those tile prepared using the standard prime coat and those tile prepared using the frothed prime coat. It was noted that there was no detectable migration of the foaming agent. The only noticeable difference in these coatings resulted in the fact that the foamed or frothed prime coat did not strike into the board surface as far as the conventional prime coat. Thus the very upper fraction of the board is not reinforced by the coating. However, evaluations of surface properties of the coating indicated comparable toughness.

What is claimed is:

1. A method for preparing a prime-coated fiberboard product, said method comprising the steps of
    preparing a frothed aqueous latex prime coating comprising a foaming agent, said frothed coating having a consistency of 500 to 750 grams per liter,
    applying said coating at a rate of 220 to 320 grams per square meter of fiberboard, and
    exposing the coated fiberboard to heat, thereby collapsing the froth and drying the coating.

2. The method of claim 1 wherein said prime coating comprises, on a solids basis, 49 to 61 parts by weight clay, 3 to 5 parts by weight latex, and from about 0.5 to 1.5 parts by weight surfactant.

3. The method of claims 1 or 2 wherein the latex is polyvinyl acetate.